United States Patent
Matsushima

(10) Patent No.: US 7,422,290 B2
(45) Date of Patent: Sep. 9, 2008

(54) BODY SUPPORT ASSEMBLY

(75) Inventor: Seiya Matsushima, Niiza (JP)

(73) Assignee: Honde Access Corporation (JP)

( * ) Notice: Subject to any disclaimer, the term of this patent is extended or adjusted under 35 U.S.C. 154(b) by 554 days.

(21) Appl. No.: 10/991,923

(22) Filed: Nov. 18, 2004

(65) Prior Publication Data

US 2005/0067877 A1  Mar. 31, 2005

Related U.S. Application Data

(62) Division of application No. 10/489,146, filed as application No. PCT/JP02/09196 on Sep. 9, 2002, now abandoned.

(30) Foreign Application Priority Data

Sep. 10, 2001 (JP) .............................. 2001-274248
Nov. 26, 2001 (JP) .............................. 2001-360074

(51) Int. Cl.
  A47C 7/02       (2006.01)
(52) U.S. Cl. .............................. 297/452.32; 297/452.28
(58) Field of Classification Search ............ 297/452.58, 297/452.28, DIG. 2, DIG. 1, 452.3, 452.32, 297/452.33, 452.35; 5/655.6, 653; 264/222
  See application file for complete search history.

(56) References Cited

U.S. PATENT DOCUMENTS

| | | | | |
|---|---|---|---|---|
| 2,847,061 A | * | 8/1958 | Morton ................... | 297/452.28 |
| 3,606,463 A | * | 9/1971 | Brooks ................... | 297/452.28 |
| 3,658,612 A | * | 4/1972 | Corzine ................... | 156/93 |
| 4,615,856 A | * | 10/1986 | Silverman ................... | 264/222 |
| 4,828,325 A | * | 5/1989 | Brooks ................... | 297/452.28 |
| 5,195,945 A | * | 3/1993 | Sandvig et al. ................... | 602/8 |
| 5,444,881 A | * | 8/1995 | Landi et al. ................... | 5/708 |
| 5,456,658 A | * | 10/1995 | Duback et al. ................... | 602/8 |
| D394,366 S | * | 5/1998 | Graebe et al. ................... | D6/601 |
| 5,755,678 A | * | 5/1998 | Parker et al. ................... | 602/6 |
| 5,980,474 A | * | 11/1999 | Darcey ................... | 602/5 |
| 6,027,777 A | * | 2/2000 | Hirano et al. ................... | 428/35.4 |
| 6,058,535 A | * | 5/2000 | Firkins et al. ................... | 5/653 |
| 6,280,815 B1 | * | 8/2001 | Ersfeld et al. ................... | 428/71 |

(Continued)

FOREIGN PATENT DOCUMENTS

JP     S56-150462     11/1981

(Continued)

*Primary Examiner*—Milton Nelson, Jr.
(74) *Attorney, Agent, or Firm*—Akerman Senterfitt

(57) ABSTRACT

A body support assembly in which irregular portions such as bunchy portions and irregular portions are prevented and further curing and holding performance are improved. The body support assembly (1) comprises a flexible cushion body (2) covered with a short-shaped cover body (3) impregnated with a curing resin and the cushion body (2) is made to abut against a user's body to be deformed in a shape matching the user's body, and then the cover body (3) is cured to be used. At least an upper edge portion of the cover body (3) is formed in a thinned edge portion (7) decreasing in thickness gradually from the cushion body (2). The thinned edge portion (7) includes a flange-shaped junction (6) formed by making a side for covering one surface of the cushion body (2) and a side for covering the other surface thereof abut against each other in an upper edge portion of the cover body (3) to be join together.

4 Claims, 14 Drawing Sheets

U.S. PATENT DOCUMENTS 6,331,170 B1 * 12/2001 Ordway ................ 602/19
6,533,971 B1 * 3/2003 Stess et al. ................ 264/40.1

FOREIGN PATENT DOCUMENTS

| JP | 05-317350 | 12/1993 |
| JP | 3001231 | 8/1994 |
| JP | 09-047467 | 2/1997 |
| JP | 09-182764 | 7/1997 |
| JP | 11-89679 | 4/1999 |
| JP | 11-90064 A1 | 4/1999 |
| JP | 11-113687 A1 | 4/1999 |
| JP | 11-180198 A1 | 7/1999 |
| JP | 2000-197539 A1 | 7/2000 |
| JP | 2001-037594 | 2/2001 |
| JP | 2001-128803 | 5/2001 |
| JP | 2001-128803 A1 | 5/2001 |

* cited by examiner

F I G. 1 2
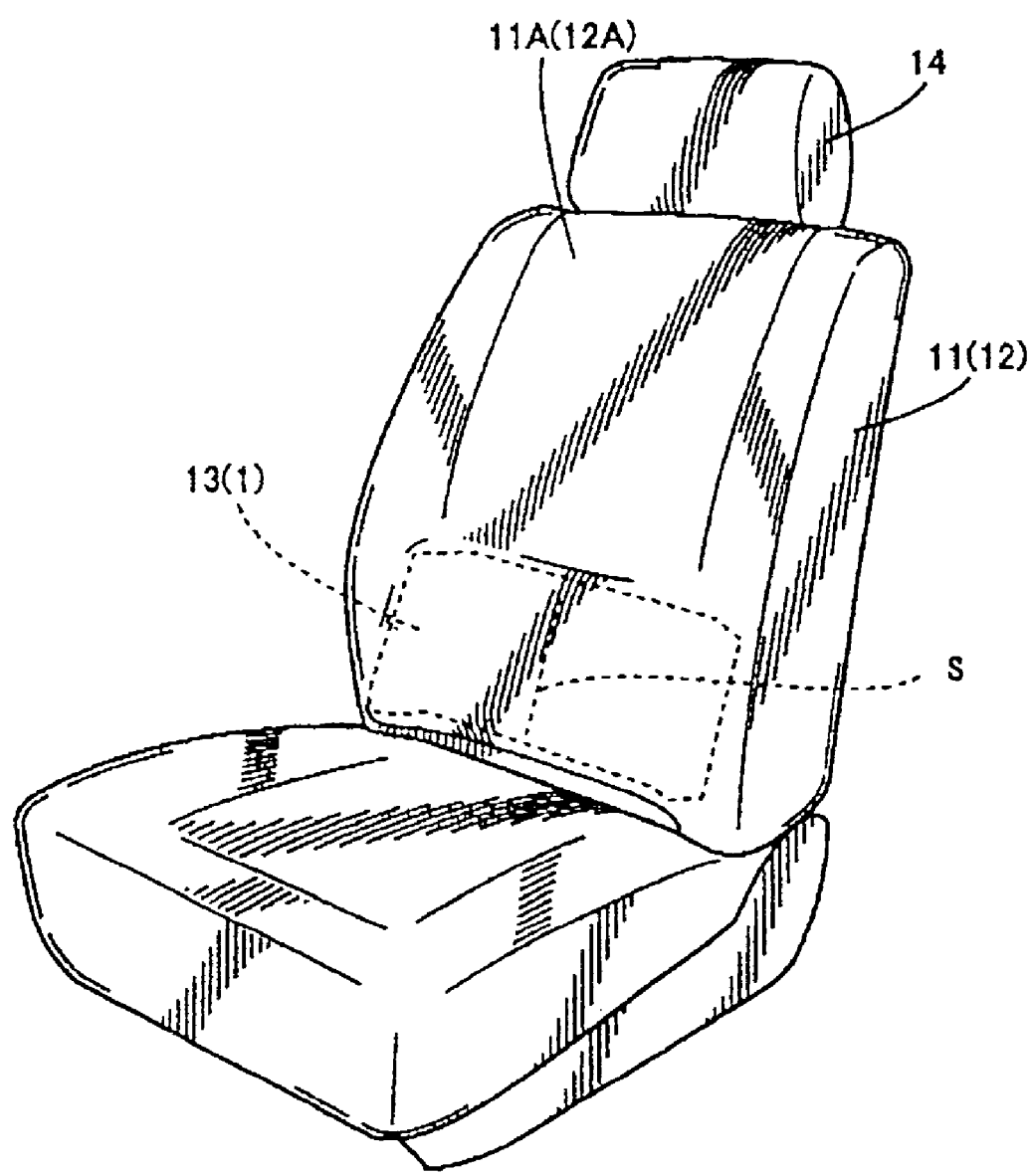

BODY SUPPORT ASSEMBLY

RELATED APPLICATION

This application is a division of U.S. application Ser. No. 10/489,146, filed Mar. 10, 2004, and now abandoned, which is a national stage entry of PCT/JP02/09196 having an international filing date of Sep. 9, 2002.

1. Field of the Invention

The present invention relates to a body support assembly that is used, for example at the time of sitting on seats, chairs or the like, particularly to the one for giving users well-fitting feeling, corresponding to respective body shapes of individual users, and is capable of keeping shapes that properly fit in the sitting shapes of individual users (or body shapes).

2. Related Art

Generally, seats and chairs, such as various types of car seats are designed so as to fit in average users, and thus some users feel somewhat uncomfortable when sitting on them.

To solve the problem, various types of seat supports (lumber supports) have been proposed in the past and some of them are put into practical use.

The inventor of the present invention has been in pursuit of the practical usefulness of such seat supports, and once devised a certain seat support which is capable of retaining the sitting shapes of users, and yet is easy to handle with such a simple structure that a flexible cushion body is covered with a sheet-shaped cover body impregnated with a curing resin and then it is abutted against a portion of users' bodies, thereby forming the flexible cushion body into shapes fitting in the portion of the users' bodies (see Japanese un-examined patent publication No. 2001-128803).

According to the prior art, it is possible to easily form the seat support so as to correspond to the sitting shape (body shape) of each user. Besides, as the seat support includes the flexible cushion body thereinside while the outside cover body is cured to retain its shape, it is not only hard but also appropriately flexible, so that well-holding ability as well as sitting comfort can be obtained. In addition, as the seat support can be provided by simply covering the same with the cover body impregnated with the curing resin, the structure thereof is such a simple one that it can be easily realized. Therefore, the conventional body support assembly was such an epoch-making one that it was suitable for mass-production, enabling the product to be provided at low prices.

As a result of subsequent studies, however, the following problems have come to be recognized concerning the above-mentioned prior art. The prior body support assembly is designed so as to have its dimension slightly larger an user's body portion against which the body support assembly is abutted, such that the support assembly is abutted against users' hip, waist, back, neck or the like and then the cushion member is deformed so as to correspond thereto, to thereby obtain extremely good supporting effect. However, a body pressure is rarely applied uniformly to a whole surface of the support assembly and the cover body 3 is attached to the cushion body 2 in a manner that is wound around the cushion body so that the cushion body 2 is enfolded as illustrated in FIG. 19. Accordingly, when the cushion body 2 is pressed and compressed, a post-curing shape of a free-end edge of the support assembly 1 is hardly regulated by the body pressure, and thus, an irregular portion A such as a boss or a corrugated irregular portion is apt to be produced on an edge, particularly on an upper edge of the cover body 3 that makes up the contour of the body support assembly 1. It has been found out that in some cases where the cover body 3 is cured in the above-mentioned irregular state, the irregular portion A abuts against user's waist, back or the like to give him an uncomfortable feeling, thus impairing the advantage of the body support assembly 1.

Since a body support assembly is normally used for supporting a backside of a user's body such as his/her buttock, waist, back or the like, the product value thereof should be able to be increased further if it is possible to provide such a body support assembly that gives user a sitting comfort during the use without causing a sense of discomfort on a portion where it is abutted against the user's backside. It has also been found out that as a body support assembly is basically long sideways and approximately rectangular, the corners thereof sometimes become a hindrance, depending on its usage. In other words, when the body support assembly is used for a car, for example, a seat belt is crossed slantwise from the user's shoulder; in that case, the user sometimes has difficulties fastening the seat belt due to the seat belt happening to be caught in a corner of the seat belt. If this problem can be solved, then it would be possible to provide a more user-friendly body support assembly, and thus it is more desirable.

The present invention has been made in view of the above-mentioned problem. It is, therefore, an object of the present invention to provide a body support assembly in which the above-mentioned irregular portion such as boss or corrugated irregular portion produced in the edge of the body support assembly is restrained by a simple means, thus improving post-curing holding performance. Particularly, it is an object of the present invention to provide a body support assembly suitable for use in a car seat or the like where a seat belt is used.

SUMMARY OF THE INVENTION

To achieve the above object, there is provided a body support assembly comprising a flexible cushion body covered with a sheet-shaped cover body impregnated with a curing resin, the cushion body being abutted against a portion of a user's body to deform the same into a shape matching the portion of the user's body, and then the cover body being cured, wherein a thinned edge portion is formed at least in an edge at one side of the cover body.

According to the above structure, if, for example, the body support assembly is set between a user's body and a specific portion of a seat against which the user's buttock, waist, back, neck or the like abuts, i.e., a position where holding performance of a seat is required, and then the user presses to deform the body support assembly while sitting, it follows that the sheet-shaped cover body impregnated with the curing resin is cured to take the thus pressed and deformed shape, so that a shape matching a specific sitting shape peculiar to individual user is kept. At this moment since the thinned edge portion decreasing its thickness gradually from the cushion body is formed in at least one edge at one side of the cover body, e.g., in an upper side thereof, the edge of the cover body that is to become a free end is smoothly deformed and cured even though the cushion body is pressed and deformed. As a result, no irregular portion is produced in the cover body with the inside of the cover body being filled with the flexible cushion body, and thus the body support assembly can combine proper hardness and appropriate flexibility, thus reducing uncomfortable feeling while realizing in turn favorable holding performance as well as sitting comfort.

Further, according to the body support assembly of the present invention the thinned edge portion includes a flange-shaped junction formed by joining one side face of the cover body for covering one surface of the cushion body and the other side face thereof for covering the other surface of the cushion body, to each other in one side of the edge portion of the cover body. Consequently, there can be simply formed the thinned edge portion where distances between the upper and the lower sides thereof are gradually narrowed toward an end of the flange-shaped junction.

Furthermore, according to the body support assembly of the present invention, the thinned edge portion is formed at least in one side of the body support assembly in a vertical direction thereof. This is due to the fact that as irregular portions such as boss or corrugated irregularity are liable to be formed in the upper or lower side of the cover body of the body support assembly, the thinned edge portion is formed at least at one side in the vertical direction of the body support assembly, thus enabling the irregular portions to be effectively prevented from being formed.

Moreover, according to the body support assembly of the present invention the cushion body is covered with one sheet of the cover body in a manner enfolded or wrapped from one side of the cushion body and thus the thinned edge portion is formed by joining both ends of the one-sheet cover body to form such flange-shaped one. Accordingly, it is possible to form the thinned edge portion in one end of the cover body by a simple process so that the thickness of the thinned edge portion is getting gradually smaller than that of the cushion body.

Besides, according to another aspect of the body support assembly of the present invention, the cushion body is covered with two-sheet cover bodies, one cover body covering one surface of the cushion body and the other cover body covering the other surface thereof, and thus the thinned edge portions are formed by joining both opposite ends of the two-sheet cover bodies to form the flange-shaped one on both sides. Accordingly, it is possible to form the thinned edge portion in both ends of the cover bodies by a simple process so that the thickness of each thinned edge portion is getting gradually smaller than that of the cushion body.

Further, the body support assembly according to the present invention includes the flange-shaped junction formed by joining the ends of the cover body by clipping means. Accordingly, the thinned edge potion can be simply formed by fixedly clipping the one side end of the cover body abutted against the other side end thereto, by means of staplers, sewing, pins, clamping fixture or the like, To attain the above objects, there is also provided a body support assembly in which the flexible cushion body is covered with the sheet-shaped cover body impregnated with the curing resin, which is abutted against the portion of the users body to be deformed into the shape matching the portion of the user's body, and then curing the cover body to be used as a body support, wherein the thinned edge portion is formed at least in one edge at one side of the sheet-shaped cover body and then both ends of the sheet-shaped cover body are overlapped to form an overlapped portion, so that both ends are joined to each other. The overlapped portion thus made is arranged on one surface of the cushion body.

According to the above structure, if, for example, the body support assembly is set between a user's body and a specific portion of a seat against which the user's buttock, waist, bas, neck or the like abuts, i.e., a position where holding performance of a seat is required, and then the user presses to deform the body support assembly while sitting, it follows that the sheet-shaped cover body impregnated with the curing resin is cured to take the thus pressed and deformed shape, so that a shape matching a specific sitting shape peculiar to individual user is kept. At this moment, since the thinned edge portion decreasing its thickness gradually from the cushion body is formed in at least one edge at one side of the cover body, e.g., in an upper side thereof, the edge of the cover body that is to become a fire end is smoothly deformed and cured even though the cushion body is pressed and deformed. As a result, no irregular portion is produced in the cover body with the inside of the cover body being filled with the flexible cushion body, and thus the body support assembly can combine proper hardness and appropriate flexibility, thus reducing uncomfortable feeling while realizing in turn favorable holding performance as well as sitting comfort.

Further, although the fact that the cushion body is thinned by pressing and deforming elicits the thick junction of the cover body, the overlapped portion of the sheet-shaped cover body is arranged on one surface of the cushion body, and therefore the body support assembly is able to be arranged so that the overlapped portion may be at an opposite side to the user's back, thus enabling the uncomfortable feeling caused by the overlapped portion of the sheet-shaped cover body to be substantially reduced.

Furthermore, according to a body support assembly of the present invention, the flexible cushion body is covered with the sheet-shaped cover body impregnated with the curing resin, which is abutted against the portion of the user's body to be deformed into the shape matching the portion of the user's body, and then curing the cover body to be used as a body support, wherein the cushion body has such a shape that at least one corner of a nearly rectangular parallelepiped body is cut with respect to a rectangular plane.

According to the above structure, if, for example, the body support, assembly is set between a user's body and a specific portion of a seat against which the user's buttock, waist, back, neck or the like abuts, i.e., a position where holding performance of a seat is required, an then the user presses to deform the body support assembly while sitting, it follows that the sheet-shaped cover body impregnated with the curing resin is cured to take the thus pressed and deformed shape, so that a shape matching a specific sitting shape peculiar to individual user is kept. At this moment, the seat belt is prevented from being caught in the corner when it is crossed slantwise, by setting the body support assembly so that the cut corner thereof may be positioned in a position to hook the seat belt, Also, a body support assembly according to a further aspect of the invention includes the cushion body that is shaped by cutting four corners of a nearly rectangular parallelepiped body. Consequently, a setting direction of the body support assembly does not need to be considered with respect to a proper position to hook the seat belt and thus convenience in use is improved.

Further, in the body support assembly according to the present invention, the sheet-shaped cover body may be cut corresponding to the cut corners of the cushion body. Hence, the sheet-shaped cover body is free from redundant portions at the cut corners, so that the seat belt is not caught therein when the scat belt is slantwise put on.

Furthermore, in the body support assembly according to the present invention, both ends of the sheet-shaped cover body may be overlapped to form the overlapped portion, in order that both the ends may be joined thereby. The overlapped portion may be arranged at one side of the cushion body, so that uncomfortable feeling caused by the overlapped portion is considerably reduced by arranging the overlapped portion at an opposite side to the user's back, when the cushion body is compressed and deformed. Particularly, the overlapped portion may be positioned in the center of one surface of the cushion body, so that uncomfortable feeling is further reduced.

Moreover, in the body support assembly according to the present invention, the thinned edge portion may be formed at least in an edge at one side of the cushion body of the sheet-shaped cover body. Hence, the edge of the cover body that is a free end is smoothly deformed to be cured even if the cushion body is compressed and deformed. As a result, no irregular portion is produced in the cover body with the inside of the cover body being filled with the flexible cushion body, and thus the body support assembly can combine proper hardness and appropriate flexibility, thus reducing uncomfortable feeling while realizing in turn favorable holding performance as well as sitting comfort.

Still further, a body support assembly according to the present invention, may include through-holes formed in nearly the center portion of the cushion body. Consequently, the center portion easily dents, so that comfortableness in use is improved.

BRIEF DESCRIPTION OF THE DRAWINGS

FIG. 12 is a perspective view showing the body support assembly in use or the same.

DETAILED DESCRIPTION

Hereunder is a detailed description of a body support assembly according to a first embodiment of the present invention with reference to FIG. 1 to FIG. 6.

Figure 1:
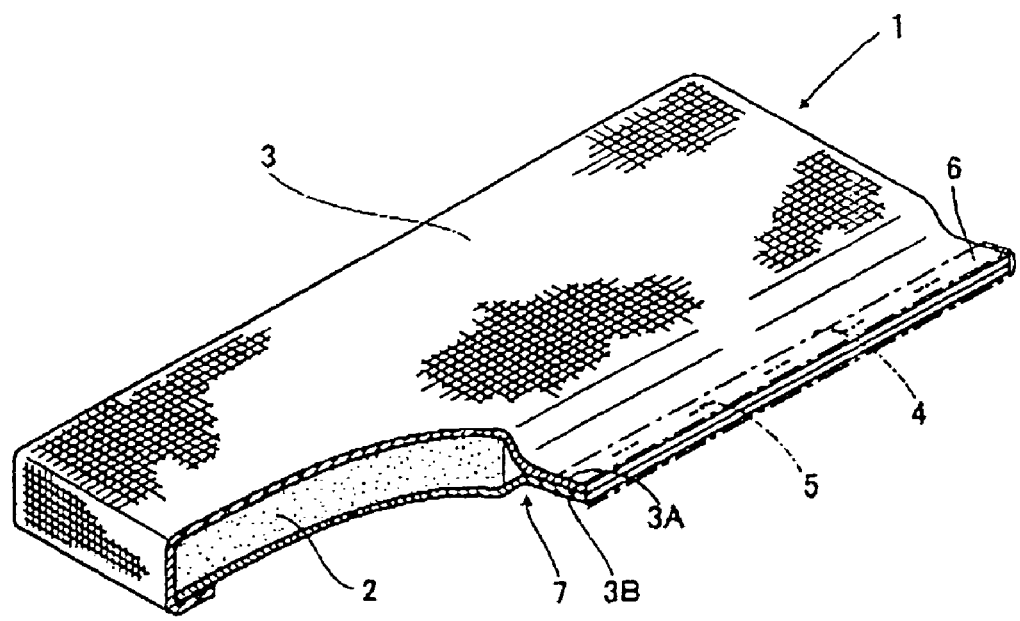
FIG. 1 is a partially cutaway and perspective view showing a embodiment of the present invention.
Figure 2:
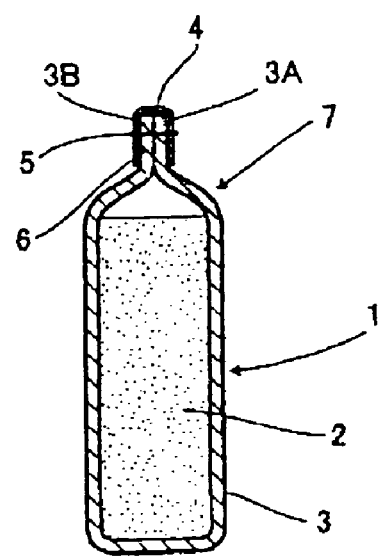
FIG. 2 is a vertical section of the body support assembly of the first embodiment.

The body support assembly 1 of the present invention comprises a flexible cushion body 2 covered with a sheet-shaped cover body 3 impregnated with a curing resin as shown in FIG. 1 and FIG. 2. The cushion body 2 is covered with the cover body 3 in a manner that is enfolded from one side thereof. One end 3A for covering one side of the cushion body 2 is abutted against an other end 3B for covering the other side of the cushion body 2 so as to be joined together with both the ends clipped by staples 5 of a stapler as a clipping means, via a tape 4 as an intermediate element, so that a flange-shaped junction 6 is formed. This flange-shaped junction 6 forms a thinned edge portion 7 of which the thickness gradually decreases from an edge at one side of the cushion body 2. The cushion body 2 is formed slightly larger than a user's specific body portion to which the body support assembly is fitted such that the cushion body 2 can hold the user's specific body portion in a manner enfolding from both the left and right sides thereof to thereby enable an extremely comfortable supporting effect to be obtained. In this embodiment, the cover body 3 can cover approximate the whole portion of the cushion body.

In the above-described body support assembly 1, the cushion body comprises a horizontally long, block-shaped foamed material which has both flexibility (resiliency) and air permeability, such as sponge serving as a flexible material. Specifically, in this embodiment, it is preferable to use polyurethane foam which is either mixed with a flame retardant material or subjected to post treatment to impart flame resistance (low flammability) in order to provide the cushion body excellent in both flame resistance and fitting comfort, The cushion body 2 is formed slightly larger than a user's specific body portion to which the body support assembly is fitted such that the cushion body 2 can hold the user's specific body portion in an enfolding manner to thereby enable an extremely comfortable supporting effect to be obtained.

The cover body 3 comprises a cloth material impregnated with a coring resin. Specifically, polyester cloth or cotton cloth may be employed as the cloth material to cover approximately the whole portion of the cushion body 2 from one side thereof as described above. For the curing resin for impregnating the cover body 3 therewith, it is preferable to use a moisture curing resin having such a property that curing occurs in a short time by adding or being exposed to moisture, such as moisture curing urethane, or otherwise by adding catalytic solution thereto. Alternatively, for a resin that meets the above-mentioned requirements and is one of the most suitable ones for the cover body 3 of the present embodiment, casting products (so-called SEANE, etc.) made by 3M HEALTH CARE Ltd. may be used as commercially available products. The casting products have a property that it is cured strongly and firmly in a short period of time (3 to 5 minutes) when immersed in water. Moreover, for this kind of the curing resin, a catalyst curing resin, for example, may be used, which has such a property that curing occurs in a short time by adding (spraying) a catalyst solution to a base resin. Although resins with other properties may also be used, it is desirable to use a resin of a type that is not cured without some kind of a trigger, such as that of the present embodiment, since it ensures that no curing occurs under a normal condition, thus providing a convenience in terms of transfer and distribution as well as a timely forming of the body support assembly 1.

The body support assembly 1 of the present invention is housed hermetically in a moisture-proof bag not shown. Consequently, as the cover body 3 is not exposed to moisture in this state, curing can be reliably prevented, while the cover body 3 is cured rapidly by exposure to moisture in such ways as by opening the moisture proof bag to add water to the cover body, allowing the cover body to contain moisture or by spraying the catalyst solution thereto.

Figure 3:
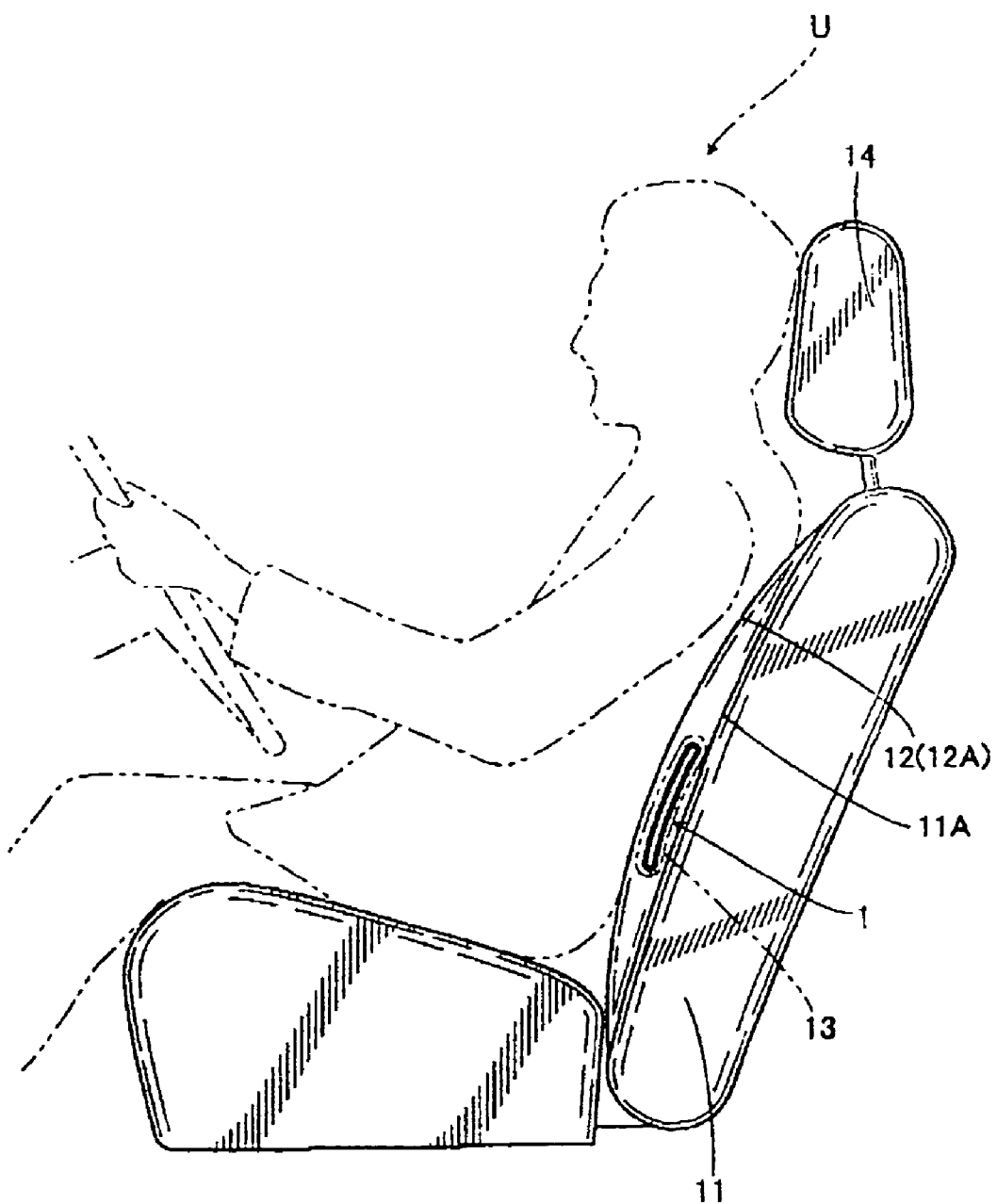
FIG. 3 is a side view showing the body support assembly in use of the firs embodiment.
Figure 4:
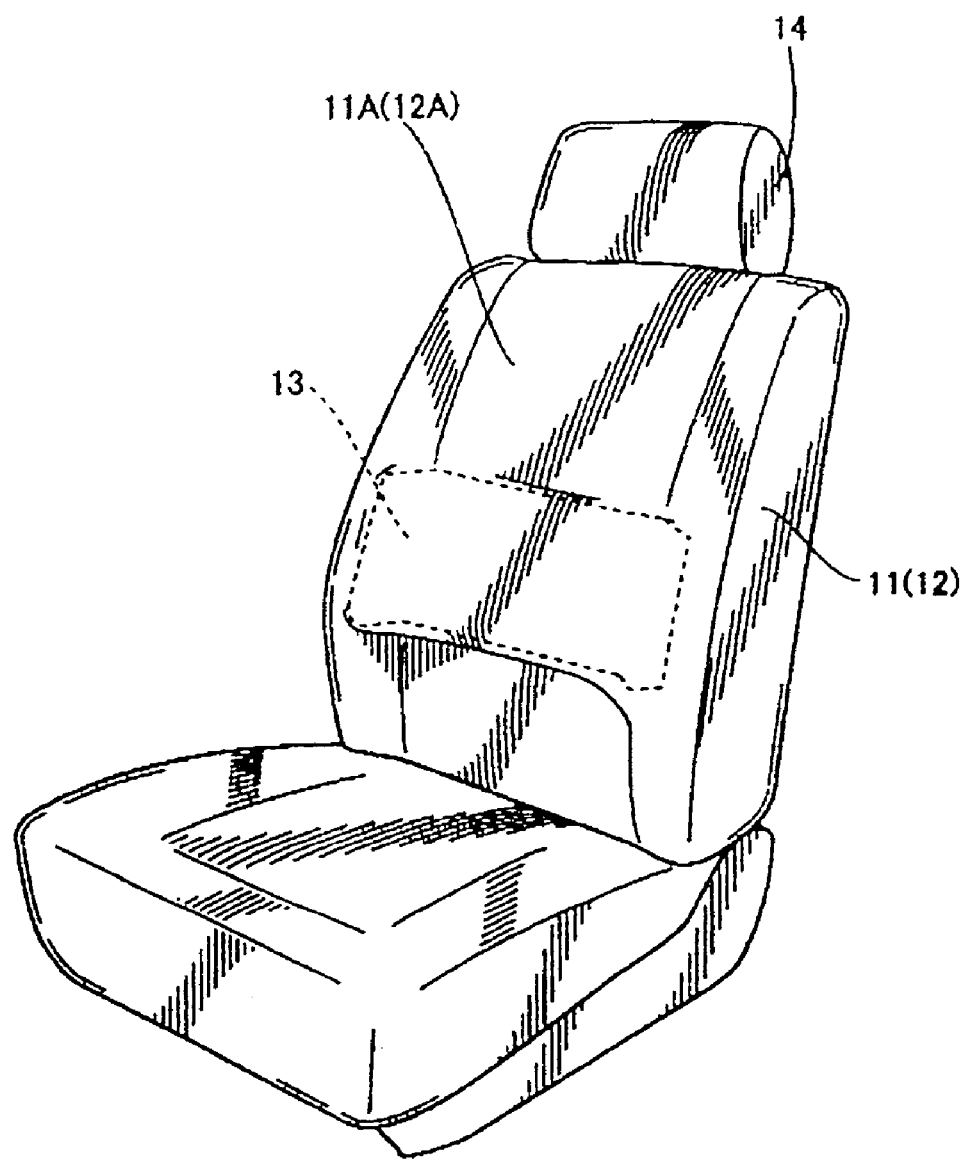
FIG. 4 is a perspective view showing the body support assembly in use of the same.

As mentioned above, the body support assembly 1 of the present embodiment is arranged in a retaining portion 13 provided in a sheet cover 12 that iv attached to cover a sheet 11 of a car or the like as shown in FIGS. 3 and 4. In more detail, the body support assembly 1 is provided in a backrest cover 12A that is attached to cover a backrest 11A of the sheet 11. A bag, serving as the aforesaid retaining portion 13 capable of housing the body support assembly 1 of the presence embodiment from is formed on an inside surface of a middle of a front portion of the backrest cover 12A, said bag having an opening on a side. In other words, the present embodiment illustrates the use of the body support assembly 1 as a support for the user's waist. An opening and closing means such as a fastener (not shown) is provided on a side face of the backrest cover 12A, so that the body support assembly 1 can be attached or detached by opening or closing the side opening of the retaining portion 13 through the opening or closing of the fastener. Consequently, when the fastener is closed, the body support assembly 1 becomes apparently invisible, and therefore the appearance of the sheet 11 in this retained (attached) state is kept extremely favorable one. In the meantime, reference numeral 14 designates E headrest.

Next is a description as to how the foregoing structure works. First, the body support assembly 1 is taken out of the moisture-proof bag (not shown). After immersing the body support assembly 1 in water or adding water to the cover body 3, excessive water is wiped up. Thus, the curing resin with which the cover body 3 is impregnated begins to be cured. Then, the fastener of the seat cover 12 (the backrest cover 12A) that is attached to cover the backrest 11A of the sheet 11 is opened and then the body support assembly 1 of the present embodiment, which is long sideways and in an erect posture, is inserted into the retaining portion 13 to be held thereby, with the thinned edge portion 7 being positioned upward, and then the fastener is closed.

Figure 5:
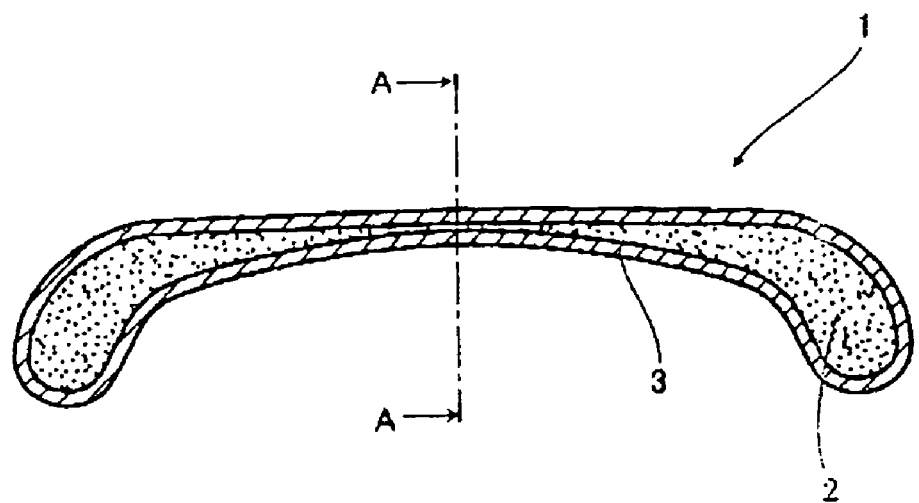
FIG. 5 is a transverse cross-sectional view showing the body support assembly in use of the same.
Figure 6:
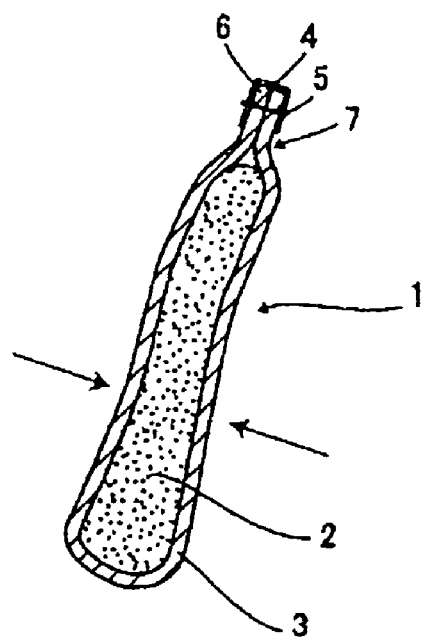
FIG. 6 is a vertical cross-sectional view taken on A-A line of FIG. 5 showing the body support assembly in use of the same.

Subsequently, when the user U presses and deforms the body support assembly 1 while sitting, the cover body 3 is solidified in a short period of time (three to five minutes) to retain a resultant shape thus pressed and deformed, so that the cushion body 2 is kept to such deformed shape owing to the solidified layer (the cover body 3). At that time, as the body support assembly 1 is designed so as to be wider than the user U's corresponding body, the cushion body 2 is largely compressed in its center portion as shown in FIG. 5, thus holding the user's body so as to enfold the user's body from left and right sides. At this moment, irregular portions such as bunchy portions and corrugated uneven portions are prone to be produced in an upper edge portion of the cover body 3 in association with the compression of the cushion body 2. According to the present invention, however, the thinned edge portion 7 is formed in an upper portion of the body support assembly 1, thus leading to the smooth deformation of the cover body 3 in the upper edge portion as shown in FIG. 6, so that such irregular portions are hardly produced.

As discussed above, the body support assembly of the present invention is advantageous in that it enable the same to be formed to an individual user's own sitting shape in a short time and quite simply and at the same time that a portion of the body support assembly which contacts the seat 11 also is deformed smoothly to a shape matching that of the seat 11 and then it is solidified, so that the body support assembly 1 can be mounted on the seat 11 in such a state that displacement thereof is unlikely to occur. Further, the fillings of the body support assembly 1 are the flexible and air-permeable cushion body 2 when the cover body 3 is cured to keep its shape, so that not only hardness but appropriate flexibility can be obtained, while its air-permeability prevents the user's body from getting stuffy despite the use thereof for a long time, thus providing favorable holding performance and comfortable sitting feeling.

Since the body support assembly 1 in the present embodiment can be made up only by covering the block-shaped foam material (the cushion body 2) with the cover body 3 impregnated with the curing resin, the structure can be easily designed to be able to be realized, enabling products with excellent mass productivity to be provided at low cost. Further, since the sheet-shaped cover body 3 comprises the polyester cloth or cotton cloth impregnated with the curing resin, the impregnation with the curing resin is easy to carry out, enabling the sheet-shaped cover body 3 to be simply manufactured.

In the conventional arts, efforts have heretofore been made to obtain a body support assembly by impregnating a foam body with a curing resin, said foam body having pores communicating with one another. According to the conventional structure, however, a curing resin filling machine is absolutely required to fill the foam body with the curing resin. According to the body support assembly 1 of the present embodiment, however, the cover body 3 is impregnated with the curing resin, and thus the curing of the cover body 3 can be easily realized by utilizing the existing material and the existing equipment. Besides, the body support assembly 1 exhibiting the above-mentioned efficacy can be manufactured simply by covering the cushion body 2 such as sponge or the like with the cover body 3, so that there can be provided the body support assembly 1 at low cost, having excellent mass productivity and simple structure.

Moreover, since the body support assembly 1 is housed hermetically in the moisture-proof bag, the curing of the cover body 3 can be prevented reliably unless it is taken out of the moisture-proof bag. Accordingly, it is excellent in respect of transport, distribution and storage, leading to the extreme easiness to handle the same.

As is discussed above, the body support assembly 1 of the present embodiment is used by covering the flexible cushion body 2 with the sheet-shaped cover body 3 impregnated with the curing resin, abutting the same against a portion of the user's body to deform the flexible cushion body to a shape matching the user's portion, and then curing the cover body 3, in which the thinned edge portion 7 is formed at least in the upper edge portion of the cover body 3. Accordingly, if, for example, the body support assembly 1 is set between the user U's body and a specific portion of the seat against which the user's waist or the like abuts, i.e., a position where holding performance of the seat is required, and then the user presses to deform the body support assembly 1 while sitting, it follows that the sheet-shaped cover body impregnated with the curing resin is cured to take the thus pressed and deformed shape, so that a shape matching the specific sitting shape peculiar to the user U is kept. At this moment, since the thinned edge portion 7 decreasing its thickness gradually from the cushion body 2 is formed in the upper edge of the cover body 3, the edge of the cover body 3 that is to become a free end is smoothly deformed and cured even though the cushion body 2 is pressed and deformed. As a result, irregular portions are unlikely to be produced in the cover body 3, and thus the body support assembly 1 can be free from uncomfortable feeling when it is in use. Further, as the cover body 3 is filled with the flexible cushion body 2, the body support assembly 1 can combine proper hardness and appropriate flexibility, thus reducing uncomfortable feeling while realizing in turn favorable holding performance as well as sitting comfort.

Furthermore, as the thinned edge portion 7 includes the flange-shaped junction 6 formed by joining one side face of the cover body 3 for covering one surface of the cushion body 2 and the other side face thereof for covering the other surface of the cushion body 2, to each other, there can be simply formed the thinned edge portion 7 where distances between the upper and the lower sides thereof are gradually narrowed toward an end of the flange-shaped junction 6.

Specifically, according to the present embodiment, the thinned edge portion 7 is formed in the upper side of the body support assembly 1. This is due to the fact that irregular portions such as boss or corrugated irregularity are liable to be formed in the upper side of the cover body 3 of the body support assembly 1. Thus, the thinned edge portion 7 is formed in the upper side of the body support assembly 1, to thereby effectively prevent the irregular portions from being formed.

Moreover, as the cushion body 2 is covered with the Cover body 3 in a manner wrapped from the upper side, while the thinned edge portion 7 is formed by joining both ends of the one-sheet cover body 3 to form such flange-shaped one, it is possible to form the thinned edge portion 7 in the upper edge of the cover body 3 by a simple process so that the thickness of the thinned edge portion 7 may be getting gradually smaller than that of the cushion body 2.

Still also, as the flange-shaped junction 6 is formed by joining the ends of the cover body 3 by the clipping means or staples 5 of a stapler, and thus the thinned edge potion 7 can be simply formed by fixedly clipping the upper ends of the cover body 3 abutted against each other in a flange-like manner.

It should be noted that since the elasticity of the cushion body 2 is impaired at the time of the pressing and deforming of the cushion body 2, there is a likelihood that the fixedly clipped portion of the cover body 3 protrudes toward the direction defined by the thickness of the cushion body 2 to become an obstacle to sitting comfort, when the cover body 3 is clipped fixedly in a portion of the cushion body 2. According to the present embodiment, however, as the ends of the cover body 3 are clipped fixedly in its upper edge portion, the flange-shaped junction 6 does not a protrude from the cushion body 2, which also makes contributions to the prevention of the sitting discomfort. Further, while the cover body 3 is clipped fixedly by staples 5 using the stapler, the tape 4 is intervened and therefore a resin component of the cover body 3 is able to be prevented from attaching to the staplers, so that workability in sequentially clipping the ends of the cover body 3 fixedly is not impaired.

Figure 7:
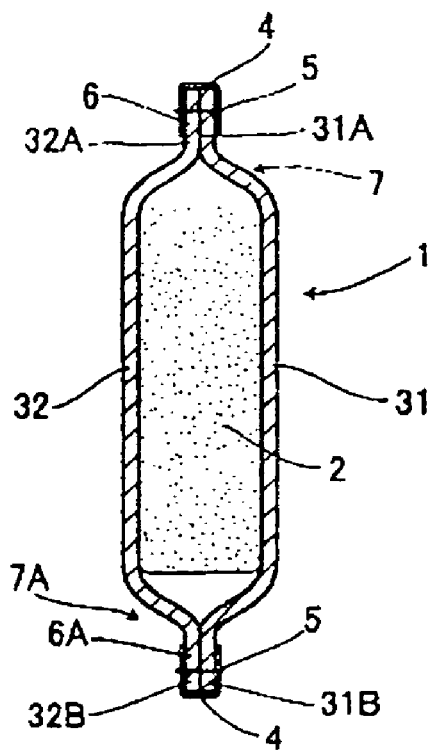
FIG. 7 is a vertical cross-sectional view showing the body support assembly of a second embodiment of the present invention.

Next is a description of a second embodiment of the present invention with reference to FIG. 7. The body support assembly 1 of the second embodiment has basically the same structure as the first embodiment described above and therefore the same reference symbols are used for parts the same as in the first embodiment and detailed description thereof is omitted.

The body support assembly 1 of the present embodiment comprises the flexible cushion body 2 whose opposite side faces are covered with a first cover body 31 and a second cover body 32 which are impregnated with a curing resin, respectively. An upper end 31A of one side face for covering one side face of the cushion body 2 and an other upper end 32A of the other side face for covering the other side face thereof are abutted to each other to be clipped by the staples 5 serving as a clipping means via the tape 4 serving as an intermediate element, so that the both ends are joined to each other. Likewise, a lower end 31B of one side face for covering one side face of the cushion body 2 and an other lower end 32B of the other side face for covering the other side face thereof are abutted to each other to be clipped by the staplers 5 as a clipping means via the tape 4 as an intermediate element, so that the both ends are joined to each other. Thus, the flange-shaped junctions 6, 6A are formed at upper and lower ends of the cushion body 2, respectively, thus enabling the thinned edge portions 7, 7A decreasing gradually in thickness to be formed in the upper and lower edges of the cushion body 2, respectively.

As is apparent from the above, the opposite side faces of the cushion body 2 are covered with the cover bodies 31, 32 respectively to join the opposite side ends 31A and 32A as well as the other opposite side ends 31B, 32B respectively so as to form the respective flange junctions, so that the thinned edge portions 7, 7A may be formed at both ends. By adopting such structure, the thinned edge portions 7, 7A decreasing in thickness gradually from the cushion body 2 can be formed in both side edges of the cover body 3 through a simple process.

Figure 8:
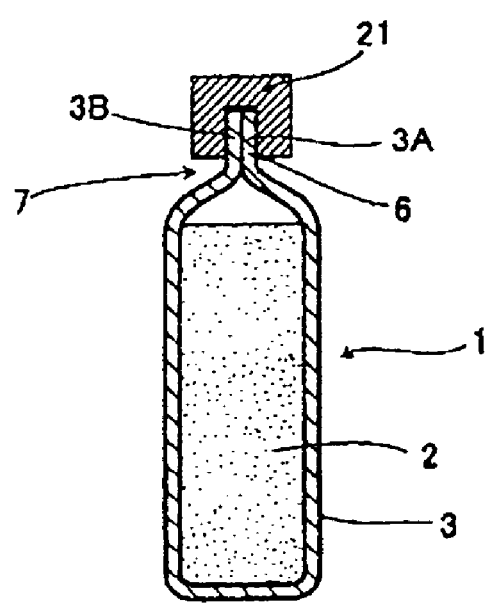
FIG. 8 is a vertical cross-sectional view showing the body support assembly of a third embodiment of the present invention.
Figure 9:
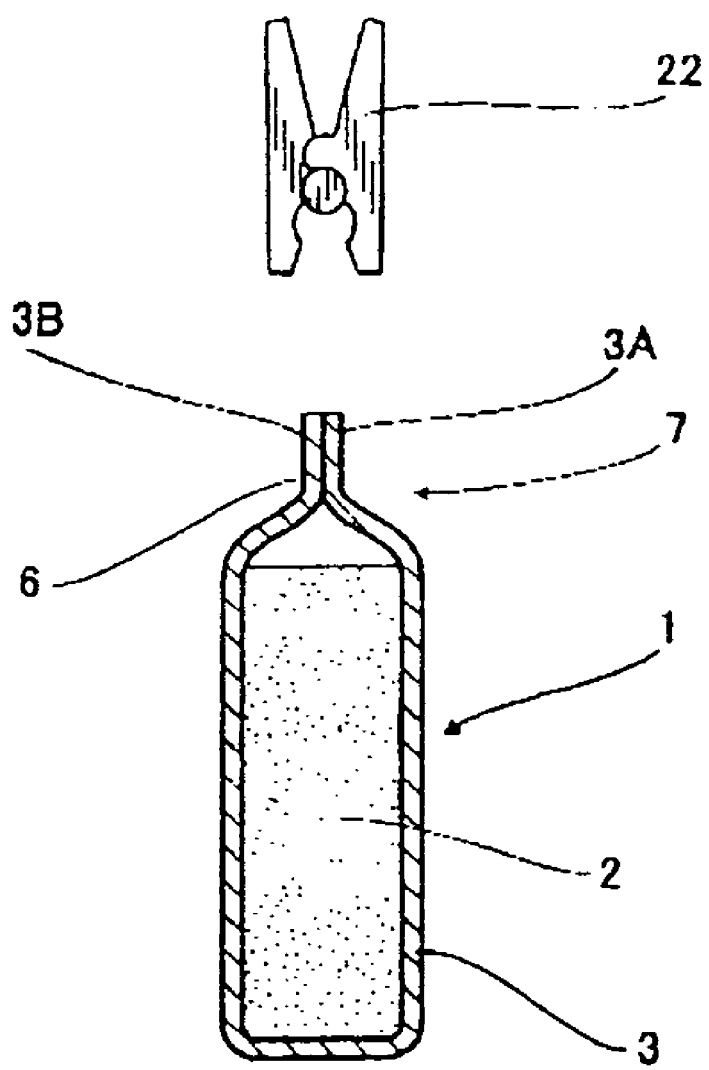
FIG. 9 is a vertical cross-sectional view showing the body support assembly of a fourth embodiment of the present invention.

Referring now to FIGS. 8 and 9, there are illustrated third and fourth embodiments of the invention. As shown in FIG. 8, the flange-shaped junction 6 may be attached in a sandwiched manner using a clamping fixture 21, which may be removed after the cover body 3 is solidified to be adhered at its ends. Alternatively, as shown in FIG. 9, the flange-shaped junction 6 may be attached in a sandwiched manner using a pinch 22, which may be removed after the cover body is solidified to be adhered at its ends, in the same manner. Further, other means such as sewing or pinning may be used. Still alternatively, the cover body 3 may be formed in an annular shape beforehand so that edges thereof may be clipped fixedly, thus forming the flange-shaped junction 6.

Next is a description of a fifth embodiment of the invention with reference to FIG. 10 through FIG. 15. The body support assembly 1 of the fifth embodiment has substantially the same structure as the first embodiment described above and therefore the same reference symbols are used for parts the same as in the first embodiment and detailed description thereof is omitted.

Figure 10:
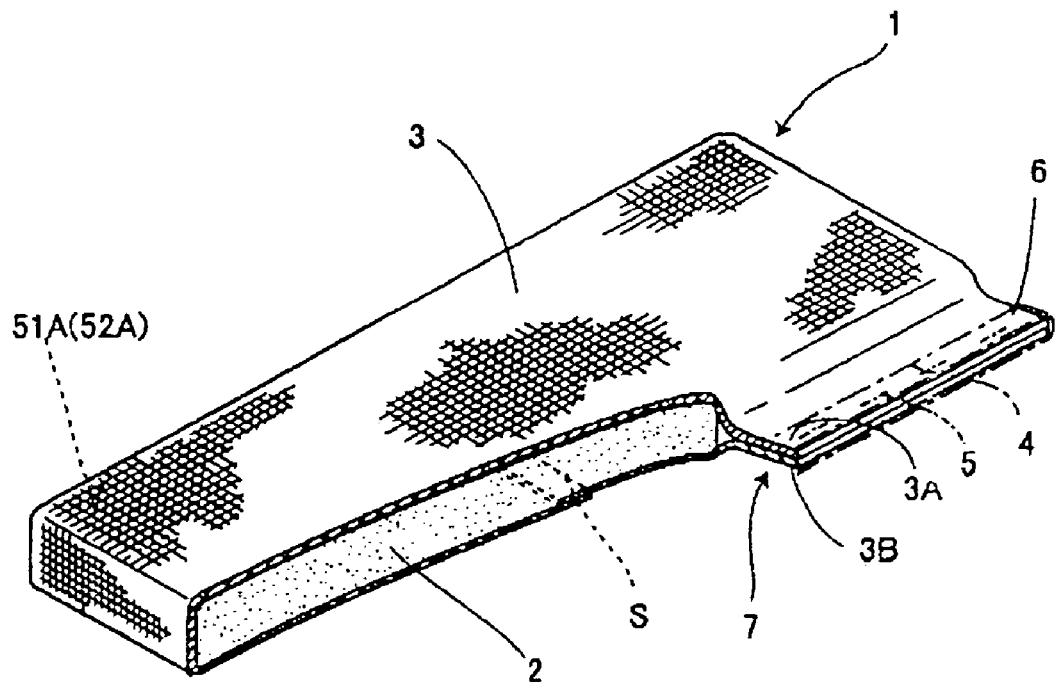
FIG. 10 is a partially cutaway and perspective view a showing a fifth embodiment of the present invention.
Figure 11:
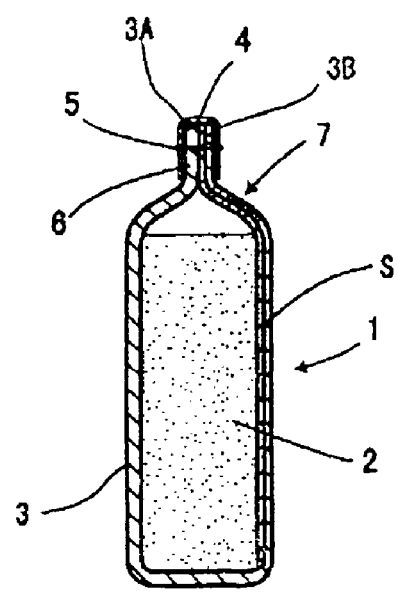
FIG. 11 is a vertical cross-sectional view showing the body support assembly of the fifth embodiment.
Figure 13:
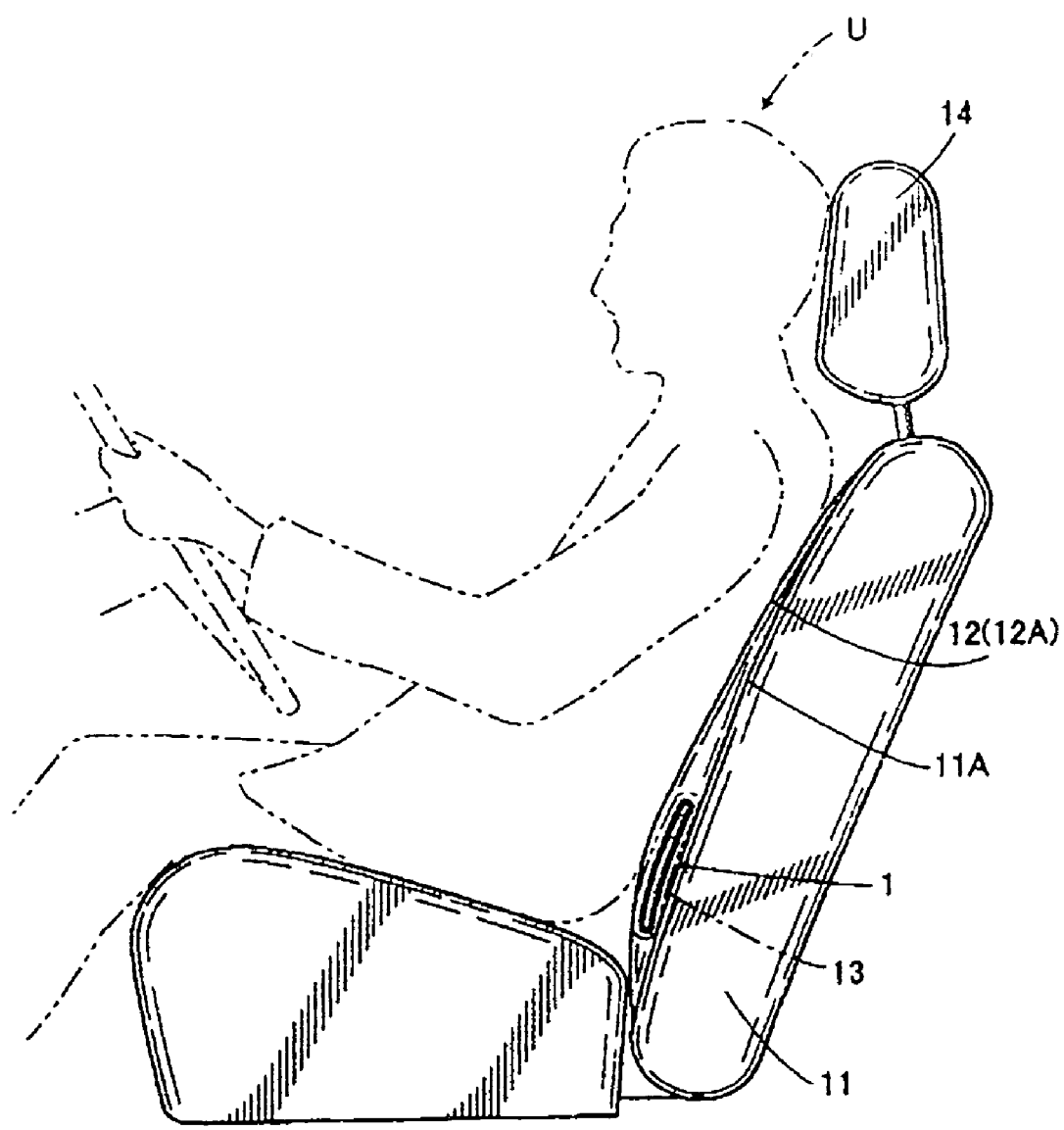
FIG. 13 is a side view showing the body support assembly in use of the same.

As shown in FIGS. 10 and 11, the body support assembly 1 of the present embodiment comprises the flexible cushion body 2 covered with the sheet-shaped cover body 3 impregnated with the curing resin. The cushion body 2 is covered with the cover body 3 in a manner wrapped from its upper side. Specifically in this embodiment, both ends of the cushion body 2 are overlapped in nearly the middle of a lower surface of the cushion body 2 to form a striated overlapped portion S in the vertical direction to thereby be joined to each other there. In the cover body 3, the end 3A of a front side (one side) covering the upper surface of the cushion body 2 and the opposite end 3B of the front side covering the lower surface of the cushion body 2 are abutted against each other to form the flange-shaped junction 6 by clipping both the ends using staples 5 serving as a clipping means via the tape 4 serving as an intermediate element to thereby join both the ends. The thinned edge portion 7 decreasing in thickness from one side edge of the cushion body 2 is formed by the flange-shaped junction 6. In the present embodiment, the cover body 3 can cover substantially the whole of the cushion body 2 by one sheet. The upper and lower sides of the cushion body 2 also are joined in the other side end of the cushion body 2 of the cover body 3, which is, however, not shown herein. However, no specific limitations shall be put on the joining method, and thus any optional joining method may be chosen, such as overlapping both sides by folding or forming the flange-shaped junction 6 for joining both sides, in the same manner as ax the front side.

Next is a description as to how the foregoing structure works. First the body support assembly 1 is taken out of the moisture-proof bag (not shown). After immersing the body support assembly 1 in water or adding water to the cover body 3, excessive water is wiped up. Thus, the curing resin with which the cover body 3 is impregnated begins to be cured. Then, the fastener of the seat cover 12 (the backrest cover 12A) that is attached to cover the backrest 11A of the sheet 11 is opened and then the body support assembly 1 of the present embodiment, which is long sideways and in an erect posture, is inserted into the retaining portion 13 to be held thereby, with the thinned edge portion 7 being positioned upward and the overlapped portion being positioned rearward, and then the fastener is closed. As a result, the body support assembly 1 is arranged in an erect posture in nearly the center of the seat 11.

Figure 14:
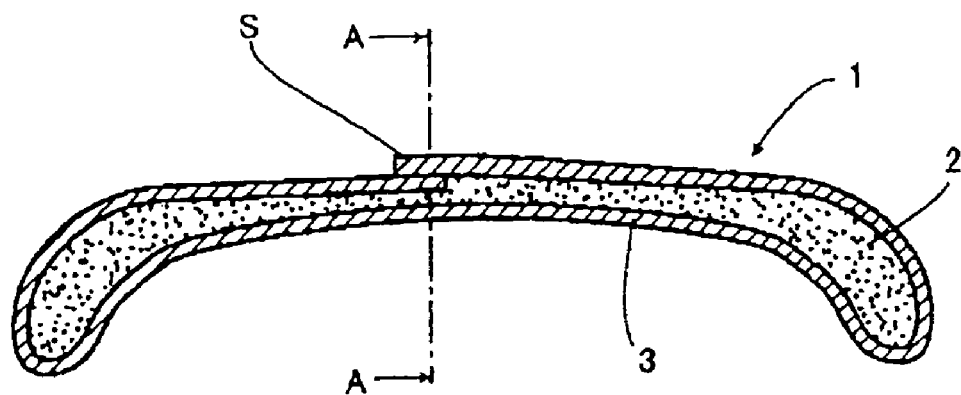
FIG. 14 is a transverse cross-sectional view showing the body support assembly in use of the same.
Figure 15:
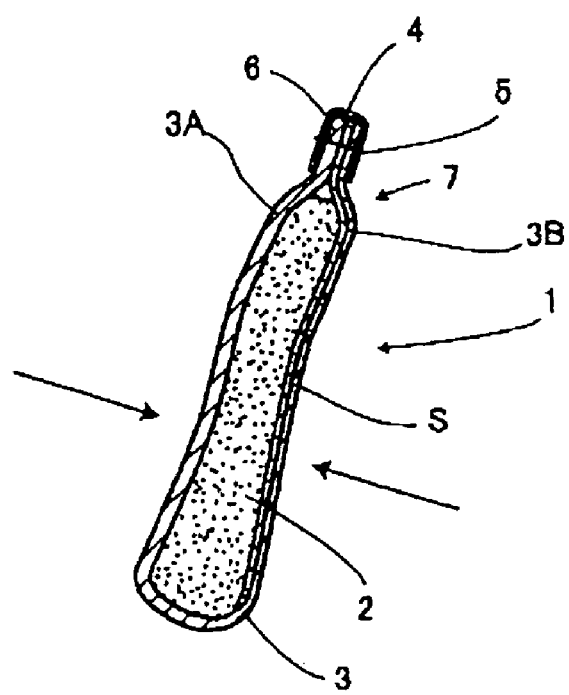
FIG. 15 is a vertical cross-sectional view taken on A-A line of FIG. 14 showing the body support assembly in use of the same.

Subsequently, when the user U presses and deforms the body support assembly 1 while sitting, the cover body 3 is solidified in a short period of time (three to five minutes) to retain a resultant shape thus pressed and deformed, so that the cushion body 2 is kept to such deformed shape owing to the solidified layer (the cover body 3). At that time, as the body support assembly 1 is designed so as to be wider than the user U's corresponding body portion, the cushion body 2 is largely compressed in its center portion as shown in FIG. 14, thus holding the user's body so as to enfold the user's body from left and right sides. At this moment, irregular portions such as bunchy portions and corrugated irregular portions are prone to be produced in an upper edge portion of the cover body 3 in association with the compression of the cushion body 2. According to the present invention, however, the thinned edge portion 7 is formed in an upper portion of the body support assembly 1, thus leading to the smooth deformation of the cover body 3 in the upper edge portion as shown in FIG. 15, so that such irregular portions are hardly produced. Further, whilst the overlapped portion S is relatively so hard that it is apt to cause discomfort due to the cured cover body 3 being overlapped there, such discomfort is drastically reduced in the present embodiment, because the overlapped portion S is positioned rearward. Furthermore, as the overlapped portion S is arranged in an erect posture in nearly the center of the seat 11, such discomfort is reduced further as the overlapped portion S is substantially aligned with the user's spine.

As discussed above, the body support assembly 1 of the present embodiment comprises the flexible cushion body 2 covered with the sheet-shaped cover body 3 impregnated with the curing resin, which is abutted against the portion of the user's body to be deformed to the shape matching the portion of the user's body, and then curing the cover body 3 to be used as a body support, wherein the thinned edge portion 7 is formed at least in one edge at one side of the sheet-shaped cover body 3 while both ends of the sheet-shaped cover body 3 are overlapped to form the overlapped portion S, said overlapped portion S being arranged in nearly the middle of a rear surface of the cushion body 2 opposing to the seat 11. Thus, if, for example, the body support assembly 1 is set in the retaining portion 13 between the user's body and a specific portion of the seat 11 against which the user's waist or the like abuts, i.e., a position where holding performance of the seat is required, and then the user presses to deform the body support assembly 1 while sitting, it follows that the sheet-shaped cover body 3 impregnated with the curing resin is cured to take the thus pressed and deformed shape, so that a shape matching a specific sitting shape peculiar to individual user U is kept. At this moment, since the thinned edge portion 7 decreasing its thickness gradually from the cushion body 2 is formed in one edge at one side of the cover body 3, the edge of the cover body 3 that is to become a free end is smoothly deformed and cured even though the cushion body 2 is pressed and deformed.

Further, although the fact that the cushion body 2 is thinned by pressing and deforming elicits the thick junction S of the cover body 3, the overlapped portion S of the sheet-shaped cover body 3 is arranged at an opposite side relative to the back side of the seat 11, thus enabling the uncomfortable feeling caused by the overlapped portion S of the sheet-shaped cover body 3 to be substantially reduced.

Specifically, by arranging the overlapped portion S in nearly the center portion, the overlapped portion S touches the center portion of the user's back, so that the uncomfortable feeling can be reduced further. As a result, the body support assembly 1 is free from the irregular portions caused by the cover body 3, combining proper hardness and appropriate flexibility, thus reducing uncomfortable feeling while realizing in turn favorable holding performance as well as sitting comfort.

Furthermore, the cushion body 2 is covered with the cover body 3 in a manner enfolded from the upper side while the overlapped portion S is formed in nearly the center of the lower surface of the cushion body 2 and the thinned edge portion 7 is formed by joining both ends of the one-sheet cover body 3 so as to form the flange-shaped junction, so that such simple process makes it possible to manufacture the body support assembly with the thinned edge portion 7 gradually decreasing in thickness from the cushion body 2 being formed in the upper edge of the cover body 3. Moreover, since the flange-shaped junction 6 is provided by joining the ends of the cover body 3 abutted against each other by the staplers 5 serving as a clipping means, the thinned edge portion 7 can be formed simply by fixedly clipping the upper ends of the cover body 3 abutted to each other in a flange-like manner.

Figure 16:
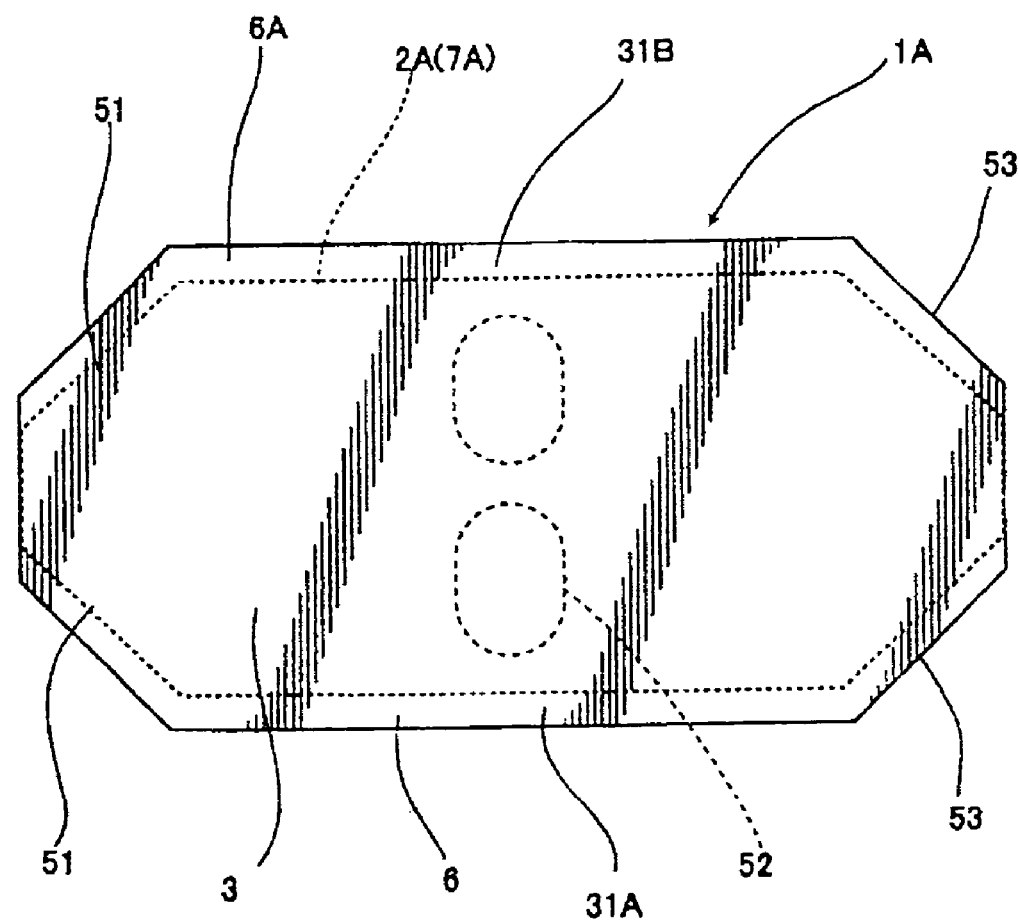
FIG. 16 is a plan view showing the body support assembly of a sixth embodiment of the present invention.
Figure 17:
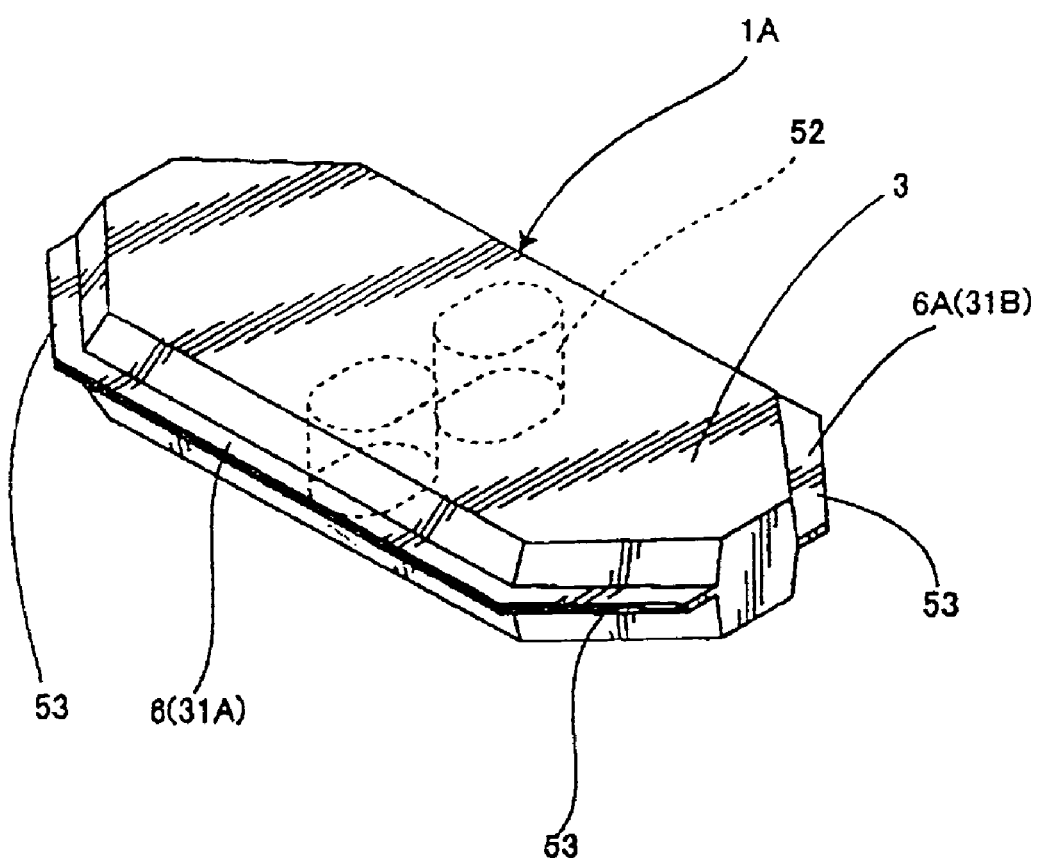
FIG. 17 is a perspective view showing the body support assembly of the sixth embodiment.
Figure 18:
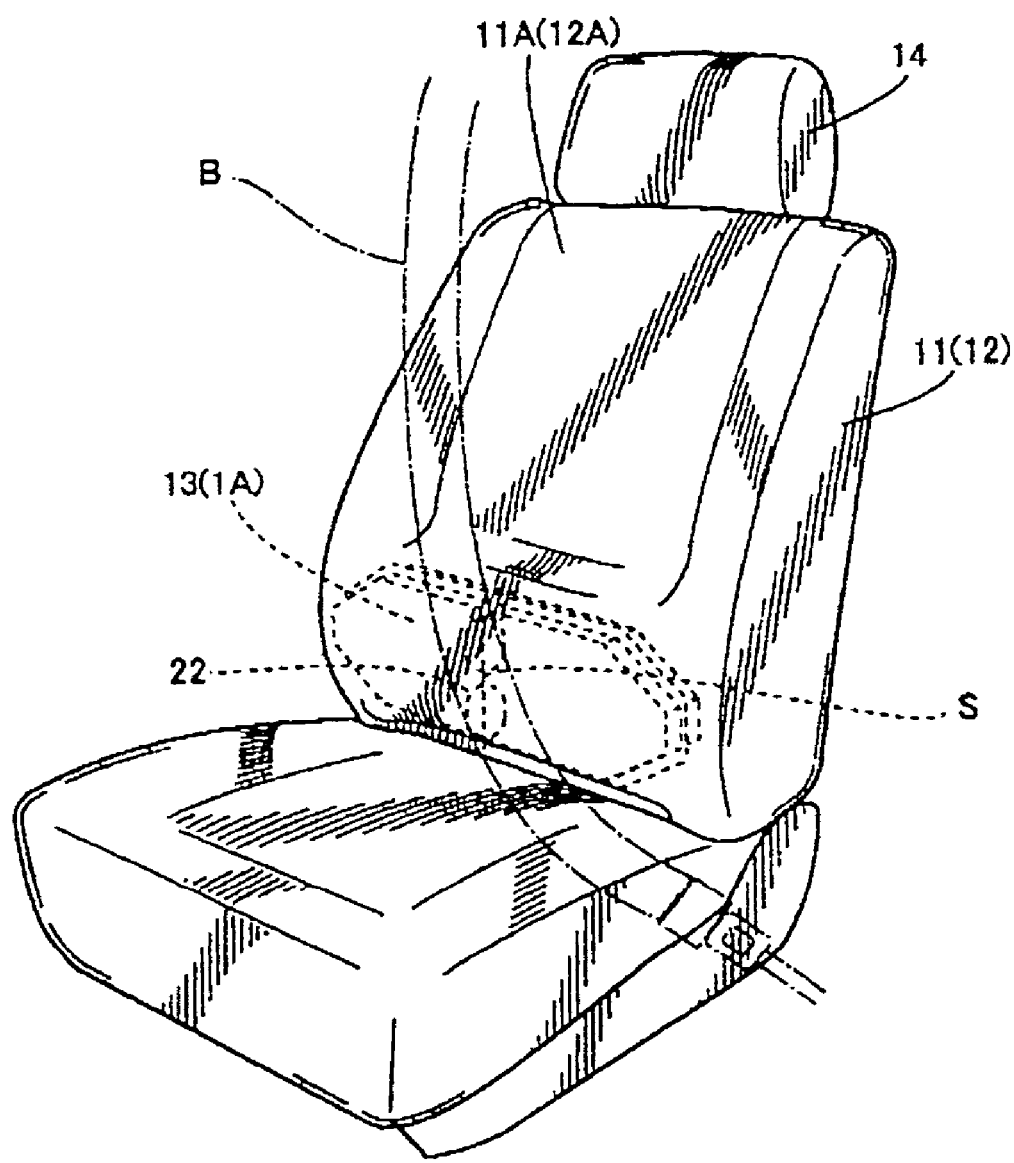
FIG. 18 is a perspective view showing the body support assembly in use of the same.
Figure 19:
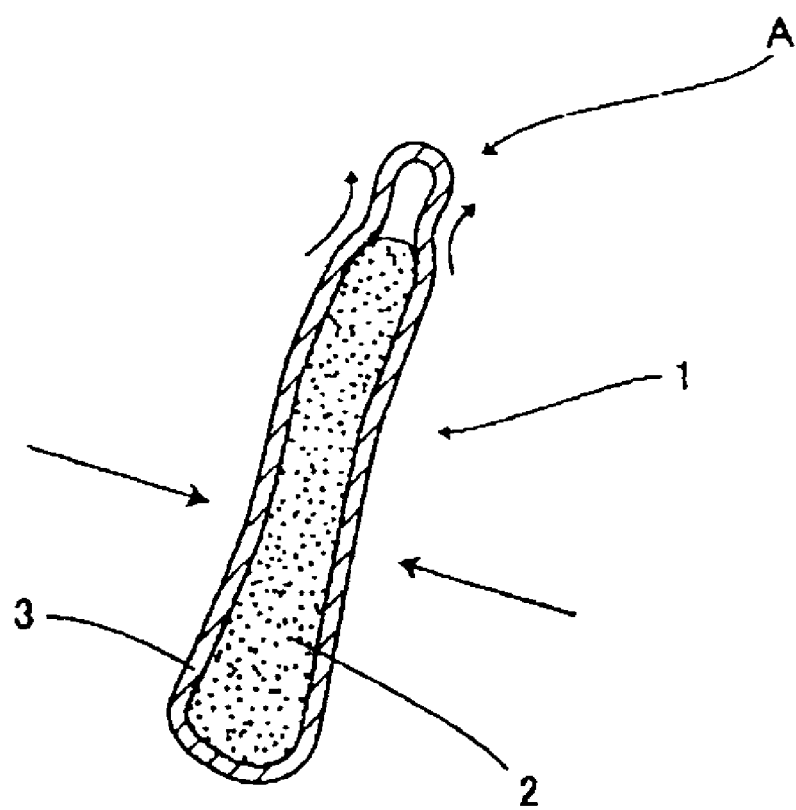
FIG. 19 is a vertical cross-sectional view showing a conventional body support assembly in use.

Next is a description of a sixth embodiment with reference to FIG. 16 through FIG. 18. A body support assembly 1A of the sixth embodiment has substantially the same structure as the fifth embodiment described above and therefore the same reference symbols are used for parts the same as in the fifth embodiment and the detailed description thereof is omitted.

The body support assembly 1A of the present embodiment comprises a flexible cushion body 2A covered with the sheet-shaped cover body 3 impregnated with the curing resin. The cushion body 2A is formed to a shape obtained by cutting slantwise and linearly four corners of a nearly rectangular parallelepiped foam body to form cut corner portion 51, respectively while two nearly oval through-holes 52 are vertically arranged in nearly the central portion with respect to the width direction of the cushion body 2A. The cushion body 2A is covered with the cover body 3 so as to be enfolded from an upper side thereof. Although not shown, both ends of the cover body 3 are, like the foregoing third embodiment, are joined together, by being overlapped in its lower side, specifically in nearly the center of the lower side, to form the striated overlapped portion extending vertically so as to substantially correspond to the through-holes 52. The cover body 3 is cut with a slight margin corresponding to the cut corner portions 51 of the cushion body 2A. In six side edges except for left and right side edges of the cushion body 2A, i.e., in the upper and lower end portions 31A, 31B and the four cut corner portions 51, the upper and lower surfaces of the cover body 3 are abutted against each other to be joined by clipping the end portions by staples (not shown) using a stapler serving as a clipping means via a tape (not shown) or the like serving as an intermediate element, so that the flange-shaped junctions 6, 6A are formed. Thus, the thinned edge portions 7, 7A gradually decreasing in thickness from the six side edges of the cushion body 2 are formed by the flange-shaped junctions 6, and 6A.

The cushion body 2A is formed slightly larger than a user's specific body portion to which the body support assembly is fitted such that the cushion body 2A can hold the user's specific body portion in a manner enfolding from both the left and right sides thereof to thereby enable an extremely comfortable supporting effect to be obtained. Alternatively, cut portions 53 of the cover body 3 corresponding to the aforesaid cut corner portions 51 of the cushion body 2A may be formed by carrying out the cutting in advance of the forming of the flange-shaped junction 6A Otherwise, the cut portions 53 may be formed by carrying out the cutting, corresponding to a final shape of the flange-shaped junction 6A after preliminarily forming the flange-shaped junction 6A and then finishing the same together with the upper and the lower end portions 31A, 31B.

For the body support assembly 1A as described above, the same cushion body and the cover body as those in the above-mentioned embodiment can be used, which are hermetically packed in a moisture-proof bag, for storage and transport for future use. The body support assembly 1A of the present embodiment can be arranged and used in the retaining portion 13 provided in the scat cover 12 that is attached to cover the seat 11 of cars or the like, as shown in FIG. 17, like the foregoing embodiments.

Then, the behavior of the above-described support assembly is described. The body support assembly 1A can be used basically in the same way as in the above-mentioned embodiment.

First, the body support assembly 1A is taken out of the moisture-proof bag (not shown). After immersing the body support assembly 1A in water or adding water to the cover body 3, excessive water is wiped up. Thus, the curing resin with which the cover body 3 is impregnated begins to be cured. Then, the fastener of the seat cover 12 (the backrest cover 12A) that is attached to cover the backrest 11A of the sheet 11 is opened and then the body support assembly 1A of the present embodiment, which is long sideways and in an erect posture, is inserted into the retaining portion 13 to be held thereby, with the overlapped portion (not shown) being positioned rearward, and then the fastener is closed. Thus, the through-holes 52 as well as the overlapped portion of the cover body 3 are arranged vertically in the nearly the center of the seat 11.

Subsequently, when the user presses and deforms the body support assembly 1A while sitting, the cover body 3 is solidified in a short period of time (three to five minutes) to retain a resultant shape thus pressed and deformed, so that the cushion body 2A is kept to such deformed shape owing to the solidified layer (the cover body 3). At that time, as the body support assembly 1A is designed so as to be wider than the user's corresponding body, the cushion body 2A is largely compressed in its center portion as shown in FIG. 14, thus holding the users body so as to enfold the user's body from left and right sides. At this moment, whilst the overlapped portion is relatively so hard that it is apt to cause discomfort due to the cured cover body 3 being overlapped there, such discomfort is drastically reduced in the present embodiment, because the overlapped portion is positioned rearward. Furthermore, as the overlapped portion is arranged in an erect posture in nearly the center of the seat 11, such discomfort is reduced further as the overlapped portion is substantially aligned with the user's spine. Specifically in the present embodiment, the oval through-holes 52 are aligned vertically, corresponding to the overlapped portion, so that the center portion is more easily dented, thus counteracting the increase in thickness caused by the overlapped portion, owing to the through-holes 12, thereby eliminating the discomfort caused by the same. It is noted that irregular portions such as bunchy portions or corrugated uneven portions are prone to be produced in the upper edge portion of the cover body 3 in associations with the compression of the cushion body 2, According to the present invention, however, the thinned edge portions 7, 7A are formed in the upper and the lower portions of the body support assembly 1A, thus leading to the smooth deformation of the cover body 3 as described in the foregoing embodiments, so that such irregular portions are hardly produced.

When the user takes the scat and puts on the scat belt B after the attachment of the body support assembly 1A thereto, it is less likely to be caught in the corners of the body support assembly 1A when buckling up, owing to the cut corners 51 provided at the four corners, respectively. Particularly, as the cut corner 51 is provided at all (i.e. four) the corners, the body support assembly 1A can be attached without paying any attention to where such cut corner 5 is formed.

As discussed above, the body support assembly 1A of the present embodiment comprises the flexible cushion body 2A covered with the sheet-shaped cover body 3 impregnated with the curing resin, which is abutted against the portion of the user's body to be deformed to the shape matching the portion of the user's body, and then curing the cover body 3 to be used as a body support, wherein the cushion body 2A includes the cut corner 51 obtained by cutting at least one corner of the nearly rectangular parallelepiped body with respect to a rectangular plane. Thus, the seat belt B is prevented from being caught in the corners when crossing the same, by attaching the body support assembly 1A to the seat 11 so that the cut corner 51 may be positioned opposite to where the scat belt is buckled. Specifically, as the cushion body 2A is shaped by cutting the four corners of a nearly rectangular parallelepiped body with respect to a rectangular plane to provide the four cut corners 51, a setting direction of the body support assembly 1A does not need to be considered with respect to a proper position to hook the seat belt and thus convenience in use is improved.

Moreover, since the sheet-shaped cover body 3 includes the cut portions 53 which are cut, corresponding to the cut corner portions 51 of the cushion body 2A, the sheet-shaped cover body 3 is free from redundant portions at the cut corners, so that the seat belt is not caught therein when the scat belt B is slantwise put on. Besides, both ends of the sheet-shaped cover body 3 are overlapped on each other to form the overlapped portion to be joined together and the overlapped portion is arranged in one side of the cushion body 2, so that by positioning the overlapped portion in an opposite side to the user's back, the uncomfortable feeling resulting from the overlapped portion of the sheet-shaped cover body 3 can be reduced to a large degree. Specifically, by arranging the overlapped portion in nearly the center portion of one side thereof, the overlapped portion touches the center portion of the backside, so that the uncomfortable feeling can be reduced further. Furthermore, since the through-holes 52 are formed near the center portion of the cushion body 2, the center portion of the backside is easily dented to increase comfortable wearing feeling further. Furthermore, since the overlapped portion of the sheet-shaped cover body 3 is arranged in nearly the center thereof, the increment of thickness resulting from the overlapped portion is reduced by the through-holes 52, thus substantially eliminating the uncomfortable feeling. More specifically, in the present embodiment, since the thinned edge portion 7 is formed in one side edge portion and the other side edge portion of the sheet-shaped cover body 3, the upper edge of the cover body 3 that is to become a free end is subjected to smooth deformation and curing even though the cushion body 2 is compressed and deformed, so that irregular portions are less likely to be caused by the cover body 3, thus making the body support assembly 1A free from wearing discomfort still further. By forming the thinned edge portions 7, 7A at both edges of the cushion body 2, no direction needs to be considered with respect to the thinned edge portion as well.

The present invention should not be limited to the foregoing embodiments, but may be modified within the scope of the invention. For example, the body support assembly of the fifth embodiment may be modified to form the cut corner 51A and a cut section 52A, as illustrated in broken line in FIG. 10. Alternatively, a cut corner may be formed at each of the four corners in FIG. 10. Through-holes 52 may be formed in the cushion body 2 in the body support assembly of the first to fourth embodiments.

The invention claimed is:

1. A body support assembly comprising:

a flexible cushion body covered with a cover sheet impregnated with a curing resin, said flexible cushion body being deformable by being abutted by a portion of a user's body, said deformation resulting in a shape matching the portion of the user's body, said deformation being carried out while said cover sheet is cured to be used as a body support, wherein said cushion body has a nearly rectangular parallelepiped body shape, and has at least one corner thereof cut off with respect to a rectangular plane, wherein both ends of said cover sheet are overlapped to each other to form an overlapped portion, said overlapped portion being arranged on one surface of said cushion body.

2. A body support assembly according to claim 1, wherein said cushion body is shaped by cutting four corners of the nearly rectangular parallelepiped body.

3. A body support assembly according to claim 1, wherein a corner of said cover sheet is cut corresponding to the cut corner of said cushion body.

4. A body support assembly according to claim 1, wherein a thinned edge portion is formed at least in an edge at one of said cushion body.

* * * * *